(12) United States Patent
Humenick et al.

(10) Patent No.: US 12,533,902 B2
(45) Date of Patent: Jan. 27, 2026

(54) METHODS AND SYSTEM FOR ADJUSTING FORMULATION OF PIGMENTS AND PERFORMING DYE SUBLIMATION PRINTING

(71) Applicant: SEKISUI KYDEX, LLC, Bloomsburg, PA (US)

(72) Inventors: Jeffrey Humenick, Bloomsburg, PA (US); Jym Kauffman, Bloomsburg, PA (US); Rebecca Gallup, Bloomsburg, PA (US)

(73) Assignee: SEKISUI KYDEX, LLC, Bloomsburg, PA (US)

( * ) Notice: Subject to any disclaimer, the term of this patent is extended or adjusted under 35 U.S.C. 154(b) by 625 days.

(21) Appl. No.: 17/972,325

(22) Filed: Oct. 24, 2022

(65) Prior Publication Data

US 2023/0128030 A1      Apr. 27, 2023

Related U.S. Application Data

(60) Provisional application No. 63/272,117, filed on Oct. 26, 2021.

(51) Int. Cl.
*B41M 5/382* (2006.01)
*B41M 5/025* (2006.01)
(Continued)

(52) U.S. Cl.
CPC .......... *B41M 5/382* (2013.01); *B41M 5/0256* (2013.01); *B41M 5/035* (2013.01);
(Continued)

(58) Field of Classification Search
CPC .... B41M 5/382; B41M 5/0256; B41M 5/035; G06V 10/82; G06V 10/993; G01N 33/32
See application file for complete search history.

(56) References Cited

U.S. PATENT DOCUMENTS

| 5,644,351 A | 7/1997 | Matsumoto et al. |
| 10,583,686 B1 | 3/2020 | Moalli |

(Continued)

FOREIGN PATENT DOCUMENTS

| JP | 6890643 B2 | 6/2021 |
| WO | WO-2020/162958 A1 | 8/2020 |

OTHER PUBLICATIONS

Ai et al. "Preparation of Silicone-Modified Acrylate Latex and Its Application for Low-Emission Printing of Pet Fibre."Autex Research Journal 19.3 (2019): 293-300. Aug. 20, 2019 (Aug. 20, 2019) Retrieved on Jan. 3, 2023 (Jan. 3, 2023) from <https://sciendo.com/article/10.1515/aut-2018-006> entire document.
(Continued)

*Primary Examiner* — Henok D Legesse
(74) *Attorney, Agent, or Firm* — Foley & Lardner LLP (57) ABSTRACT

Methods and systems for adjusting formulation of pigments for dye sublimation are disclosed. In one embodiment, the method includes receiving, by a processor, a selection of the substrate and the image to be dye sublimated into the substrate. The method also includes determining, by the processor, an amount of each pigment of sublimation ink to be used to print the image on a sheet based on a characteristic of the substrate. The method further includes printing, by a dye sublimation apparatus, the image on the sheet using the amount of each pigment of sublimation ink and infusing, by the dye sublimation apparatus, the image from the sheet into the substrate.

18 Claims, 4 Drawing Sheets

(51) Int. Cl.
*B41M 5/035* (2006.01)
*G01N 33/32* (2006.01)
*G06V 10/82* (2022.01)
*G06V 10/98* (2022.01)

(52) U.S. Cl.
CPC .............. *G01N 33/32* (2013.01); *G06V 10/82* (2022.01); *G06V 10/993* (2022.01)

(56) References Cited

U.S. PATENT DOCUMENTS

| | | |
|---|---|---|
| 10,940,715 B2 | 3/2021 | Moalli |
| 11,065,909 B2 | 7/2021 | Moalli |
| 2004/0073526 A1 | 4/2004 | McClanahan |
| 2005/0070434 A1 | 3/2005 | Drake |
| 2007/0039682 A1 | 2/2007 | Drake et al. |
| 2011/0229664 A1 | 9/2011 | Hoggard |
| 2012/0196085 A1 | 8/2012 | Langan et al. |
| 2013/0280494 A1* | 10/2013 | Grunwald ............. B29C 43/145 |
| | | 264/319 |
| 2015/0029289 A1 | 1/2015 | Rosner et al. |
| 2016/0297224 A1 | 10/2016 | Edwards |
| 2016/0368286 A1* | 12/2016 | Rossinyol Casals ........................ |
| | | B41J 11/0015 |
| 2021/0297557 A1* | 9/2021 | Yamamoto ........... H04N 1/6033 |
| 2022/0169805 A1 | 6/2022 | Stabler et al. |

OTHER PUBLICATIONS

International Search Report and Written Opinion on PCT App. PCT/US2022/046818 dated Feb. 14, 2023 (8 pages).

* cited by examiner

| | Final color #123456 | Final color # 222222 | Final color #548125 | ← 302 |
|---|---|---|---|---|
| Cyan | 306a | 306b | 306c | |
| Magenta | 308a | 308b | 308c | |
| Yellow | 310a | 310b | 310c | |
| Black | 312a | 312b | 312c | |

↑
304

300b

| | Final color #123456 | Final color # 222222 | Final color #548125 | ← 322 |
|---|---|---|---|---|
| Cyan | 326a | 326b | 326c | |
| Magenta | 328a | 328b | 328c | |
| Yellow | 330a | 330b | 330c | |
| Black | 332a | 332b | 332c | |

METHODS AND SYSTEM FOR ADJUSTING FORMULATION OF PIGMENTS AND PERFORMING DYE SUBLIMATION PRINTING

CROSS-REFERENCE TO RELATED APPLICATIONS

This application claims the benefit of and priority to U.S. Provisional Application No. 63/272,117, filed Oct. 26, 2021, the entire disclosure of which is incorporated by reference herein.

TECHNICAL FIELD

This disclosure is directed generally towards a dye sublimation apparatus and more specifically towards adjusting formulation of pigments for dye sublimation.

BACKGROUND

Dye sublimation is a process of infusing images to a substrate. An image to be infused is printed on a paper (or any type of sheet) using sublimation dyes (contained in the sublimation inks) and the printed paper is pressed against a substrate (generally a thermoplastic material) under heat. The heat causes the dyes to sublimate from a solid state on the printed paper to a gaseous state to travel into the substrate, where the dyes get deposited as solids. This sublimation process therefore infuses the image in the printed paper (or sheet) into the substrate. As the infused image is embedded within the substrate, the image may not chip, fade, or delaminate like capped and printed images.

A customer may use different types of thermoplastic substrates (e.g., different colors, different polymers) with the same customer's design on the substrates. For example, in the aviation industry, the customer may want to use different substrates on different portions of an airplane seat (e.g., the seat back shell made out of one substrate, but the seat tray table made out of another substrate), but wants the particular design to appear consistent on both substrates. Due to the differences in the material properties of different substrates, particularly different color substrates, the image printed on one substrate may not appear as intended on the other substrate, even if the same process is used to infuse the image.

Figure 1:
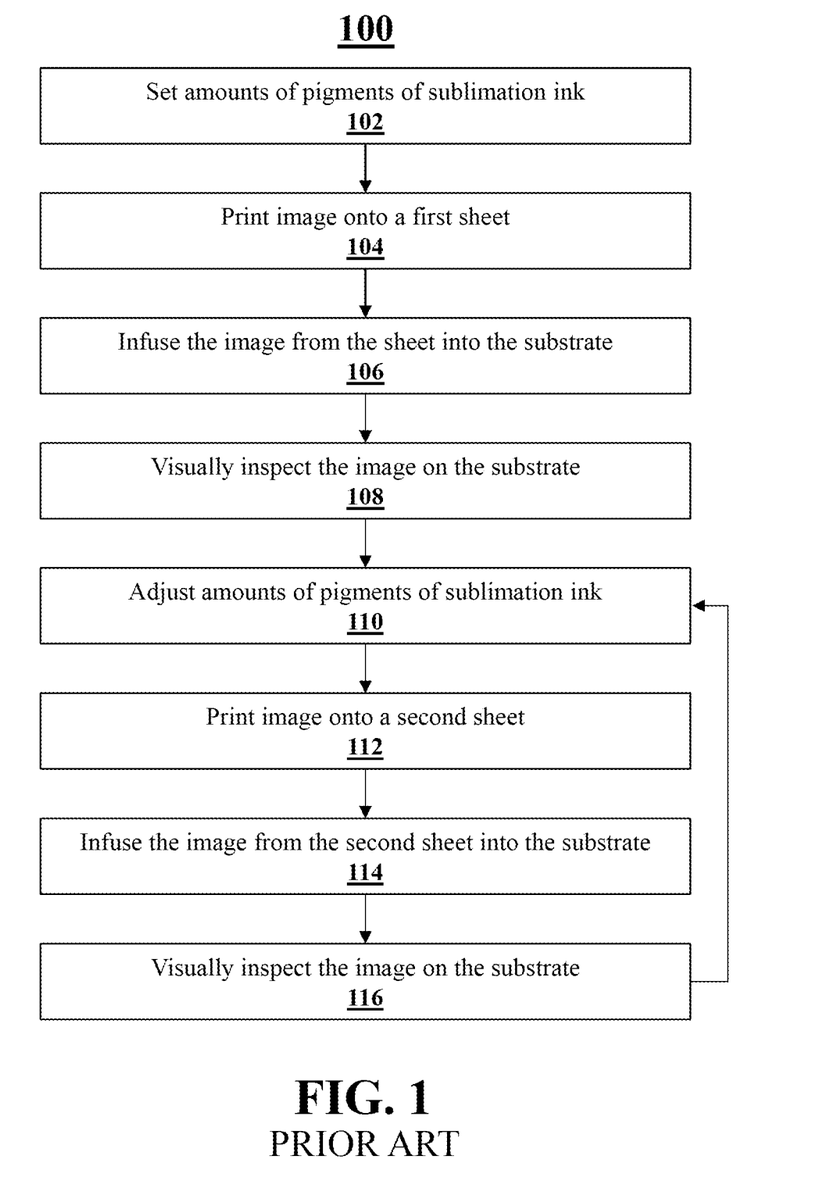
FIG. 1 shows a flow diagram of a conventional process for manually checking the image on the infused substrate.

The conventional process for obtaining uniform images across different substrates is time-consuming and resource intensive. For example, FIG. 1 shows a flow chart of the conventional process 100. The user may have already printed an image on a first substrate (e.g., seat back shell), and desires to include the same image on a second substrate (e.g., seat tray table part). The process 100 begins with setting amounts of pigments (or pigment amounts) of each sublimation ink that may be the same amounts that were used for the first substrate 102, since the user who is infusing the image on the second substrate may not have any other frame of reference. Using a dye sublimation apparatus, the image is printed onto a first sheet 104. Then the image is pressed against (i.e., infused into) the substrate using heat 106. Then the user visually inspects the colors of the image of the substrate to decide whether the image is the colors that it should be (i.e., the same as the image on the first substrate) 108. Because the uniformity of the image across different substrates is almost impossible to do correctly the first time when using one's own eyes to manually check, the user has to adjust the amounts of pigments of sublimation ink 110. The user prints the image again onto a second sheet 112, infuses the image into another substrate 114, and then manually checks again for uniformity 116. The operations 110-116 can be repeated multiple times until the amounts of pigments are exactly what is required to get the image to appear the same on the second substrate as the first substrate.

SUMMARY

When the user prints the image on a sheet and dye sublimates the image into the substrate, the image may not turn out the way the user had desired. This results in the user having to adjust the sublimation dye formulation based on a visual inspection and repeat the process until the dye amounts are correct and the substrate includes the image as desired. Further, even if the user is able to get the image the customer desires right on a first substrate, the dye formulation may need to be adjusted for a second substrate because the first and second substrates may have different colors or materials. Therefore, the user needs to adjust the pigment amounts for different substrates.

Accordingly, there is a desire to optimize the selection of pigment amounts of the sublimation ink. The embodiments herein adjust a formulation of the pigments depending on the substrate. A processor in the system is able to receive as input an image and the type of substrate on which the user desires to apply the image. The processor is able to then provide the formulation of the pigments that are required to print the image on a sheet which is later dye sublimated onto the substrate. The processor is able to do this by maintaining a database of past prints and the results that were obtained including the final colors and pigment amounts that were formed used the substrate. The processor can also provide the formulation by using a machine learning model that can learn from previous data.

In one embodiment, a computer-implemented method for printing an image to be infused into a substrate through dye sublimation comprises receiving, by a processor, a selection of the substrate and the image to be dye sublimated into the substrate. The method also includes determining, by the processor, an amount of each pigment of sublimation ink to be used to print the image on a sheet based on a characteristic of the substrate. The method further includes printing, by a dye sublimation apparatus, the image on the sheet using the amount of each pigment of sublimation ink and infusing, by the dye sublimation apparatus, the image from the sheet into the substrate.

In another embodiment, a system for printing an image to be infused into a substrate through dye sublimation, includes a processor configured to receive the substrate and the image to be dye sublimated into the substrate; and determine an amount of each pigment of sublimation ink based on the image and the substrate. The system further includes a printer configured to print the image on a sheet using the amount of each pigment of sublimation ink; and a dye sublimation apparatus configured to dye sublimate the image into the substrate.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented herein.

Obtaining consistent and uniform images (e.g., designs, patterns, logos, pictures, text, etc.) across different substrates using dye sublimation can be challenging because the final images that are infused in the substrates are dependent on the substrates themselves. The substrates' characteristics (e.g., the color and material) can greatly influence the final image. If a user wants an image in a substrate, the user needs to print the image with a different (or varied) color into the sheet (e.g., paper) than the user would have used with a substrate that may be white or another color having a lesser effect on the resulting color. When the pigments are infused into the substrate, the colors mix to yield the desired color in the substrate. As another example, the substrate may be formed of a thermoplastic material that may react to heat and/or certain sublimation inks in a way that a different substrate does not. Accordingly, the user may not be able to use the same pigment amounts (or formulation) for the different substrates even if the final image to be obtained is the same.

Manually adjusting the pigment amounts for the printer is a very time-consuming and resource intensive process. It requires many rounds of trial and error and wasted substrates because the user correctly guesses how much the pigment amounts need to be adjusted in order to get the final image in the substrate. Accordingly, there is a need for a more efficient and/or an automated process of adjusting pigment amounts to obtain the final images that are consistent across the different substrates.

The present disclosure provides embodiments of an automated methods and systems of adjusting pigment amounts based on a selected substrate. The user can build and maintain a database that keeps track of what pigment loads were used to make which colors on which substrates. The system can also employ machine learning models that can predict within a certain threshold (e.g., +/−10%) an amount of each pigment to be used to obtain a final image in the substrate that is similar to or the same as the original image. A combination of machine learning model(s) and visual inspection can also be used to take advantage of the machine learning model's ability to predict the pigment loads within a certain threshold and make educated adjustments thereafter. Accordingly, the user is able to advantageously save time and resources in producing images amongst different substrates consistent with the intended design.

Figure 2:
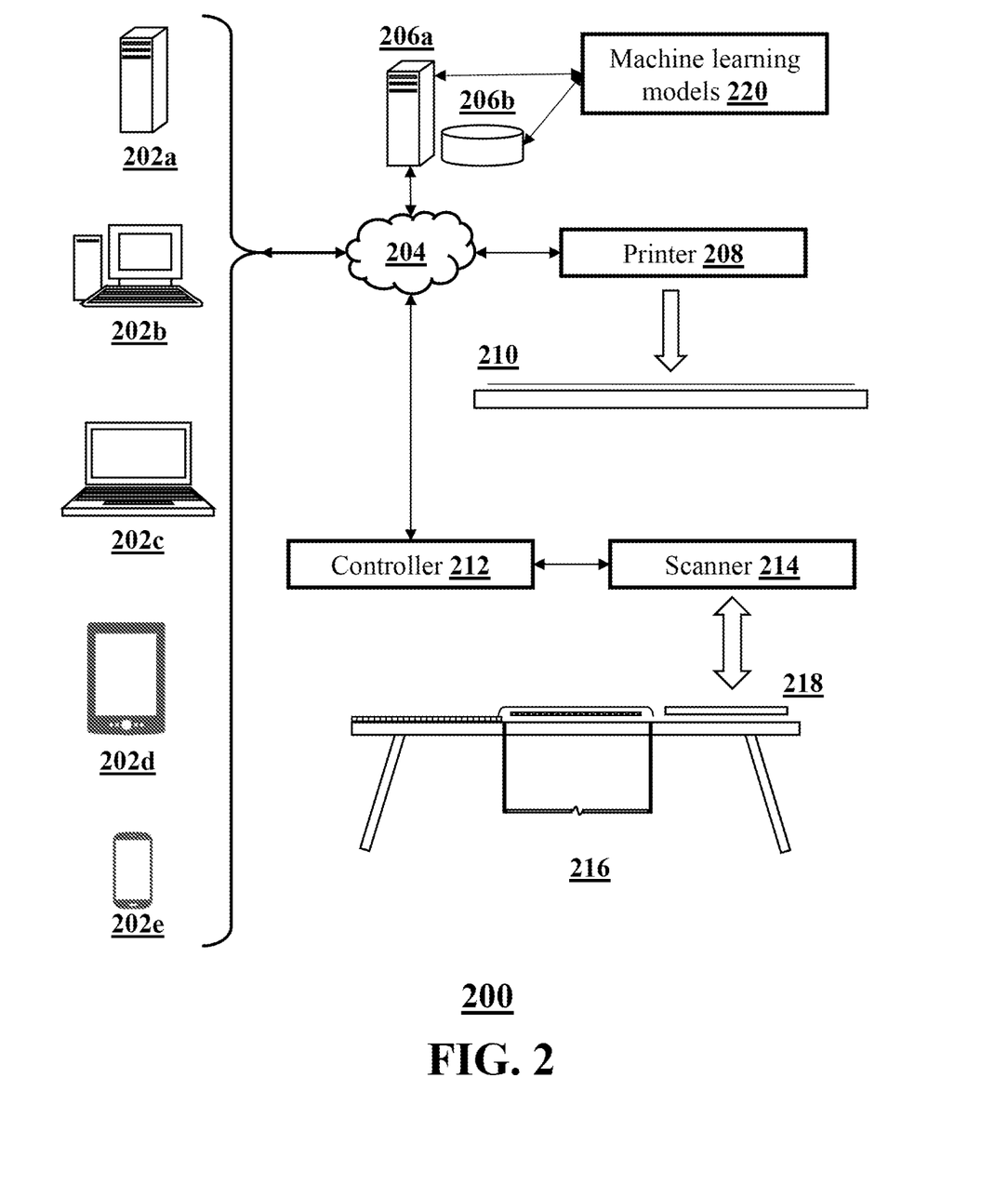
FIG. 2 shows an illustrative system for dye sublimation, according to an embodiment.

FIG. 2 shows an illustrative system for dye sublimation, according to an embodiment. As shown, the system 200 may comprise computing devices 202a, 202b, 202c, 202d, 202e (collectively or commonly referred to as computing device 202), a network 204, a processor (or analytics server) 206a, a database 206b, a printer 208, a controller 212, a scanner (or camera) 214, and a dye sublimation apparatus 216. It should be understood that the system 200 and the aforementioned components are merely for illustration and systems with additional, alternative, and a fewer number of components should be considered within the scope of this disclosure.

The computing devices 202 may include any type of processor based device that may provide a digital file, print commands, and/or one or more input parameters to the printer 208 through the network 204. The processor in the computing devices 202 may also provide commands to the controller 212 through the network 204. Non-limiting examples of the computing devices 202 include a server 202a, a desktop computer 202b, a laptop computer 202c, a tablet computer 202d, and a smartphone 202e. However, it should be understood that the aforementioned devices are merely illustrative and other computing devices should also be considered within the scope of this disclosure. At minimum, each computing device 202 may include a processor and non-transitory storage medium that is electrically connected to the processor. The non-transitory storage medium may store a plurality of computer program instructions (e.g., operating system, applications) and the processor may execute the plurality of computer program instructions to implement the functionality of the computing device 202.

A computing device 202 may provide an interface for a user to enter one or more input parameters to control the printing process of the printer 208. For example, a user may use a command line interface or a graphical user interface in the computing device 202 to enter parameters such as pigment amounts, the image, and the type or characteristics of the subject substrate (e.g., color, material, density, or another characteristic). It should be understood that the one or more input parameters may be inputted at or retrieved from any part of the system 200. It should also be understood that a functionality attributed to a component of the system 200 is done merely for illustration and a similar functionality may be implemented by other components in the system 200.

The network 204 may be any kind of local or remote network that may provide a communication medium between the computing devices 202, the processor 206a, the printer 208, and the controller 212. For example, the network 204 may be a local area network (LAN), a desktop area network (DAN), a metropolitan area network (MAN), or a wide area network (WAN). However, it should be understood that the aforementioned types of networks are merely illustrative and any type of component providing the communication medium between the computing devices 202, the processor 206a, the printer 208, and the controller 212 should be considered within the scope this disclosure. For example, the network 204 may be a plurality of single wired connections between the computing devices 202, the processor 206a, the printer 208, and the controller 212.

The processor 206a may receive, process, and transmit data to/from the printer 208, the computing device 202, and the controller 212. While the system 200 is shown to have a single processor 206a, the processor 206a may include any number of computing devices operating in a distributed computing environment, such as a cloud environment.

The printer 208 may be any type of printer that may print an image with sublimation ink on the paper (or sheet) 210, which may then be used for dye sublimation to transfer the image into the substrate 218. For example, the printer 208 may be an inkjet printer that may print the image through jets of ink from a print head to the sheet 210. The printer 208 may include driver software to control the components of the printer 208. The driver software may include rasterizer modules that may generate a raster image corresponding to a digital image file transmitted by a computing device 202. The printer 208 may include a processor and a non-transitory storage medium that is electrically connected to the processor in the printer 208 (or the processor 206a). The processor may use the raster image to determine the ink coverage for the image or a portion thereof. The non-transitory storage medium may store a plurality of computer program instructions (e.g., the driver software) that the processor may execute to implement the functionality provided by the printer 208.

The scanner 214 can take (or scan or capture or photograph) images of the substrate 218 using a scanner, a camera or any type of photosensitive device that can capture an accurate colored image of the substrate 218 after the image has been transferred into the substrate 218. The scanner can be controlled by the controller 212. Once the image of the substrate 218 has been taken, the controller 212 can transmit the image to the processor 206a. The processor 206a can pair the pigment amounts that were used to print the image on the sheet 210 and the captured image from the substrate 218 as an entry in the database 206b. Alternatively, the pair of pigment amounts and the captured image can be used as an input to a machine learning model to train the model to accurately predict the pigment amounts that are required for producing the same image on different substrates. In some embodiments, the scanner 214 can be a handheld digital camera and provide the image file to the controller 212.

The controller 212 may control the scanner 214 and communicate with the processor 206a via the network 204. The controller 212 may be a processor or any other type of controller that may be used to communicate with the scanner 214 and the network 204. When the substrate 218 is finished cooling after the image has been infused therein, the controller 212 may trigger the scanner 214 to capture the colored image of the substrate 218 at a predetermined distance.

In addition to the controller 212, the scanner 214 may be controlled based upon instructions provided by the computing device 202 and/or the processor 206a. For example, the computing device 202 may include an interface for a user to enter the quality of image to be captured by the scanner 214. In some situations, the customer may not require that the image be exactly the same across the different substrates and allow for some level of variation. In some embodiments, the user of the system 200 can instruct the scanner 214 to take a lower quality image of the substrate 218. Then the machine learning model of the processor 206a may output a set of pigment amounts that can roughly approximate the image but may not exactly the same. This can save resources of training the machine learning model, for example.

The processor 206a may store machine learning models (e.g., neural networks, random forest, support vector machines, etc.) 220 in memory or the database 206b. Specifically, the machine learning models 206b may use a supervised, unsupervised, and/or semi-supervised learning method. The amount of available data may dictate the type of machine learning techniques used. The models 220 can be trained to predict and/or calculate the amounts of pigments of sublimation ink required to obtain a final image of the substrate (e.g., an image that is uniformly dye sublimated for the substrates). The processor 206a may train the machine learning models 220 using the amounts of pigments used to print using the printer 208, the final images that are captured by the scanner 214, and/or characteristics of the substrate 218 (e.g., color or material). In some embodiments, the processor 206a may train a single machine learning model 220 that incorporates the amounts, the final images, and the characteristics as mixed inputs or a plurality of machine learning models 220 that do not include one or more inputs. For example, a separate machine learning model 220 may be used for each type of substrate that is used for dye sublimation. The user may choose the type of machine learning model 220 that is used for determining the pigment amounts by selecting the model 220 using the computing device 202 or the processor 206a.

For instance, the processor 206a may receive the pigment amounts used by the printer 208, the final images captured by the scanner 214 via the controller 212, and the characteristics of the substrate 218 on which the final images were infused. The processor 206a can then generate one or more sets of labeled training data indicating attributes that were used to create the final images in the substrate 218. The processor 206a may input the set of labeled training data into the stored machine learning models 220 for supervised training to teach the machine learning models 220 to predict confidence scores for pigment amounts needed to generate a particular color on a particular substrate 218. The processor 206a may continue to feed the training data into the machine learning models 220 until the machine learning models 220 are accurate to a threshold and store the models 220 in the database 206b. The images fed into the processor 206a may be one color or a plurality of colors, and the images may include the entire image of the substrate 218, a portion of the substrate 218, or a single pixel. If the entire image is fed, the machine learning model 220 can provide the pigment amounts for the entire image as well as the individual pigment amounts needed to print each pixel. Similarly, if a portion of the substrate 218 is fed, the machine learning model 220 can provide the pigment amounts for the entire portion and the individual pixels needed to collectively produce portion of the substrate 218. Similarly, if a single pixel is fed, the machine learning model 220 can provide the pigment amounts needed for a single pixel of the substrate 218.

The processor 206a may train the machine learning model(s) 220 based on the differences and the weights for the plurality of pixels. To do so, the processor 206a may determine the loss for individual pixels by assigning the determined weight for the pixel(s) to a loss function determined based on a predicted label and a ground truth for the pixel(s). The processor 206a may assign the determined weights to any stored loss functions to generate an executable loss function. The processor 206a may train the machine learning model 220 using the weighted loss functions for individual pixels and/or the weighted loss function for the image. The processor 206a may use a back propagation technique to determine a gradient for the respective loss function and update the weights and/or parameters of the machine learning model 220 using the gradient, such as by using gradient descent techniques. Upon being trained, the processor 206a may determine an accuracy for the machine learning model 220 by feeding the machine learning model 220 another image. The processor 206a may determine an accuracy for the image by comparing the output prediction labels (the predicted pigment amounts) to the ground truth prediction labels (the actual pigment amounts that was used to produce the image) for the images and compare the accuracy to a threshold. The processor 206a may iteratively feed the machine learning model training images until determining the model 220 is accurate to a threshold, at which point the processor 206a may use the machine learning model 220 in real-time to predict pigment amounts to produce the correct image on the different substrates 218.

For example, after training a machine learning model 220 to a threshold accuracy, the processor 206a may receive an image of a scan of the substrate 218 taken by the scanner 214. The image may not be labeled. The processor 206a may feed the image (e.g., feed the characteristics of individual pixels of the image) into the machine learning model 220 and execute the model 220 to obtain an output of predicted labels (actuals for the individual pixels of the image). The processor 206a may control or adjust the pigment amounts or settings of the printer 208 based on the predicted output and the substrate 218 to be used.

In some embodiments, a machine learning model 220 may be used in conjunction with a user's visual inspection. Because machine learning may sometimes require much training data, the additional value that is provided by many more training sets may be incremental and not worth the time and resources of training the machine learning model 220 further. In such a situation, the user may choose to use the machine learning model 220 to provide a predicted output of the pigment amounts that is within the threshold but thereafter manually adjust the pigment amounts to arrive at the required pigment amounts that will yield a consistent image. For example, the threshold for the machine learning model 220 may be set so that the predicted output is accurate to a certain confidence level. After the user has manually adjusted the pigment amounts and arrived at the required pigment amounts, the user can feed the image of the substrate 218 and the pigment amounts with a label to train the machine learning model 220 further so that the next time the machine learning model 220 is used, the predicted result will be more accurate. In this manner, the machine learning models 220 can continually learn or be retrained from additional data and resulting prints.

The database 206b can store images that have captured (or taken or scanned or photographed) the substrates and the corresponding amounts of pigment that was used to print the image on the sheet 210 that was later transferred into the substrate 218. The stored images can include a matrix of color values (or color codes) that represent the colors used for the matrix of pixels.

The dye sublimation apparatus 216 may be used to perform the dye sublimation process in which the image from the sheet 210 is infused (e.g., dye sublimated) into the substrate 218. The dye sublimation apparatus 216 may be a combination of components that may infuse the image from the printed sheet 210 into the substrate 218. The image may be printed using sublimation inks including sublimation dyes that may transform from solid state to gaseous state when heated to a predetermined temperature. The sublimation dyes may travel into the substrate 218 and deposit therein thereby creating an infused image into the substrate 218. Furthermore, the dye sublimation apparatus 216 can include the printer 208.

Figure 3:
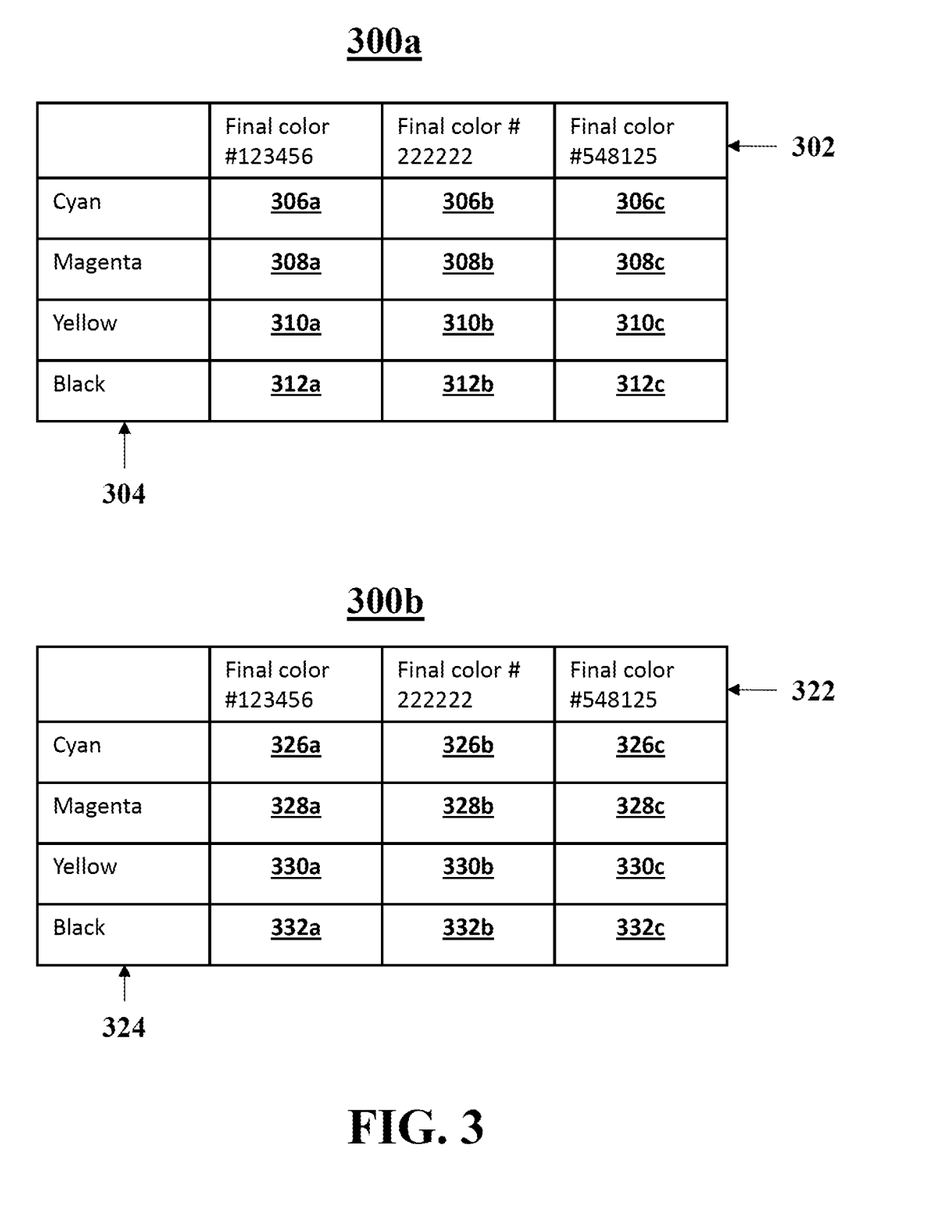
FIG. 3 shows an illustrative table included in a database used for selecting pigment amounts, according to an embodiment.

FIG. 3 shows an illustrative tables 300a and 300b that are visual representation of a database used for selecting pigment amounts, according to an embodiment. Separate tables can be generated for each substrate material. For example, the table 300a can be for a first substrate, and the table 300b can be for a second substrate. Row 302 may represent the final colors that were captured by the scanner 214, and column 304 may represent the pigment colors that were used to produce the corresponding final color on the first substrate. The intersections of the columns and rows includes a plurality of entries 306a-c, 308a-c, 310a-c, and 312a-c. Although a certain number of rows and a certain number of columns are shown in the tables 300a and 300b, embodiments are not limited thereto, and more or fewer rows and columns may be used, depending on the configuration of the database and/or machine learning model. Although certain color code values are used for illustration, embodiments are not limited thereto, and any scheme may be used to represent the colors. Furthermore, even though the cyan, magenta, yellow, black (CMYK) color model is shown, embodiments are not limited thereto, and any other color model (e.g., red, green, blue (RGB)) may be used. Furthermore, there may be mixed or other colors that are used in addition to the cyan, magenta, yellow, and black colors. For example, in addition to cyan, magenta, yellow, and black, the table 300a can include a row for any variety of colors that may have its own pigment that is used to print the image on the sheet.

The values in the entries 306a-c, 308a-c, 310a-c, and 312a-c can represent the amounts of pigment that were used for the corresponding color (from column 304) and the corresponding final color (from row 302) in a previous printing. For example, entry 306a may have a value of 10% that represents the relative amount of pigment for cyan that was used to create the color #123456 for first substrate. Entry 308a may be 20%, entry 310a may be 30%, and entry 312a may be 40%, which represent the relative amounts of pigment for the colors magenta, yellow, and black, respectively, that were used to create the color #123456. If there was 1 mL of total ink used on the substrate (or pixel), the user would know that 0.1 mL was cyan, 0.2 mL was magenta, 0.3 mL was yellow, and 0.4 mL was black. Accordingly, the next time the user tries to create the color #123456 on the first substrate, the user knows to use these amounts (or relative amounts). Furthermore, although percentages are used for the values in the entries 306a-c, 308a-c, 310a-c, and 312a-c in table 300a, embodiments are not limited thereto, and other values may be used. For example, the entries 306a-c, 308a-c, 310a-c, and 312a-c may be populated with volume amounts.

The database including the table 300a can be populated by user entry or based on the outputs of a machine learning model from the processor 206a. For example, for the user entry mode, the user can take photographs of the image of the substrate 218 (by using any type of camera or the scanner 214) and upload them to the database 206b. The user can also upload the pigment amounts that were used to print the image on the sheet 210 that was transferred into the substrate 218.

In some embodiments, a machine learning model may not be used at all. Instead, the images and their corresponding pigment amounts may be stored in the database 206b. In such embodiments, the user can query the database 206b to get the pigment amounts that are the closest to the desired outcome. For example, the user may want to obtain color #234512 for the second substrate. The user can query the database 206b and obtain all of the entries in the database 206b where color #234512 was obtained or colors that are similar to color #234512. If color #234512 has never been obtained on the second substrate, the user can then make an educated prediction as to what the pigment amounts should be in order to obtain that color based on the queried results of colors that are similar to #234512. The user can then adjust the pigment amounts for the next printing to bring the infused image in the substrate 218 closer to the desired final image.

Table 300b includes row 322, column 324, and a plurality of entries 326ac, 328a-c, 330a-c, and 332a-c. The row 322 may represent the final colors that were captured by the scanner 214 for the second substrate, and the column 324 may represent the pigment colors that were used to produce the corresponding final color on the second substrate. The entries 326a-c, 328a-c, 330a-c, and 332a-c can be populated with amounts of pigment dye that were used to create the colors in row 322 on the second substrate.

When the user queries the pigment amounts from the tables 300a or 300b, the user can set the entire image or multiple pixels of the sheet to be printed with the same color. When the image is complicated and has a variety of colors and/or shades, the processor 206a can calculate the pigment amounts that need to be applied for the entire image based on a difference between the pigment amounts that are retrieved from the database and the pigment amounts that were used in the last printing. For example, the user can query the database 300a to show that the pigment amounts should be 0.5 mL cyan, 1 mL magenta, 1.2 mL yellow, and 0.3 mL black to obtain the color #382732 for the first substrate. If 1 mL was used across all of the four colors, the user can calculate the difference between the predicted amounts and the previous amounts as −0.5 mL cyan, +0 mL magenta, +0.2 mL yellow, and −0.7 mL black. Then the processor 206a can adjust the pigment amounts for all of the pixels by the same difference. For example, in the last print, if the pigment amounts used for another pixel were 0.7 mL for all of the CMYK colors, the processor 206a can adjust the pigment amounts to be 0.2 mL cyan, 0.7 mL magenta, 0.9 mL yellow, and 0 mL black in order to obtain the color desired for the pixel. This example is just one example method of adjusting pigment amounts for the entire image, but a variety of methods can be utilized.

In some embodiments, the system 200 can automatically adjust the pigment amounts for each pixel based on an original image received by the customer and the substrate. For example, the processor 206a can analyze the original image provided by the customer and feed the original image into the machine learning model to output the required pigment amounts for each pixel. Then the pigment amounts can be provided to the printer so that the printer can accordingly print on the sheet using the determined pigment amounts. And once the image is dye sublimated into the substrate, the final image can look similar to or the same as the original image that was received from the customer. In some embodiments, the user may still need to repeat the process, but it will still save much more time and resources than the conventional methods.

In some embodiments, the system 200 can be used to dye sublimate a substrate for a new image and yield a final image that is similar to or the same as the original image, even if the new image has never been printed or dye sublimated before. For example, the user can receive a new image from the customer that the customer wants to apply to one or a variety of substrates. The user can input the new image and the customer's selected substrate into the machine learning model or query the database as described above. Then the machine learning model can produce a predicted output that includes the pigment amounts for each pixel to obtain the desired outcome on the substrate. When the machine learning model is not used, the user may query the database to obtain pigment amounts. The user can then set the pigment amounts for the first printing of the new image such that the final image on the substrate is similar or the same as the final image in the substrate.

Figure 4:
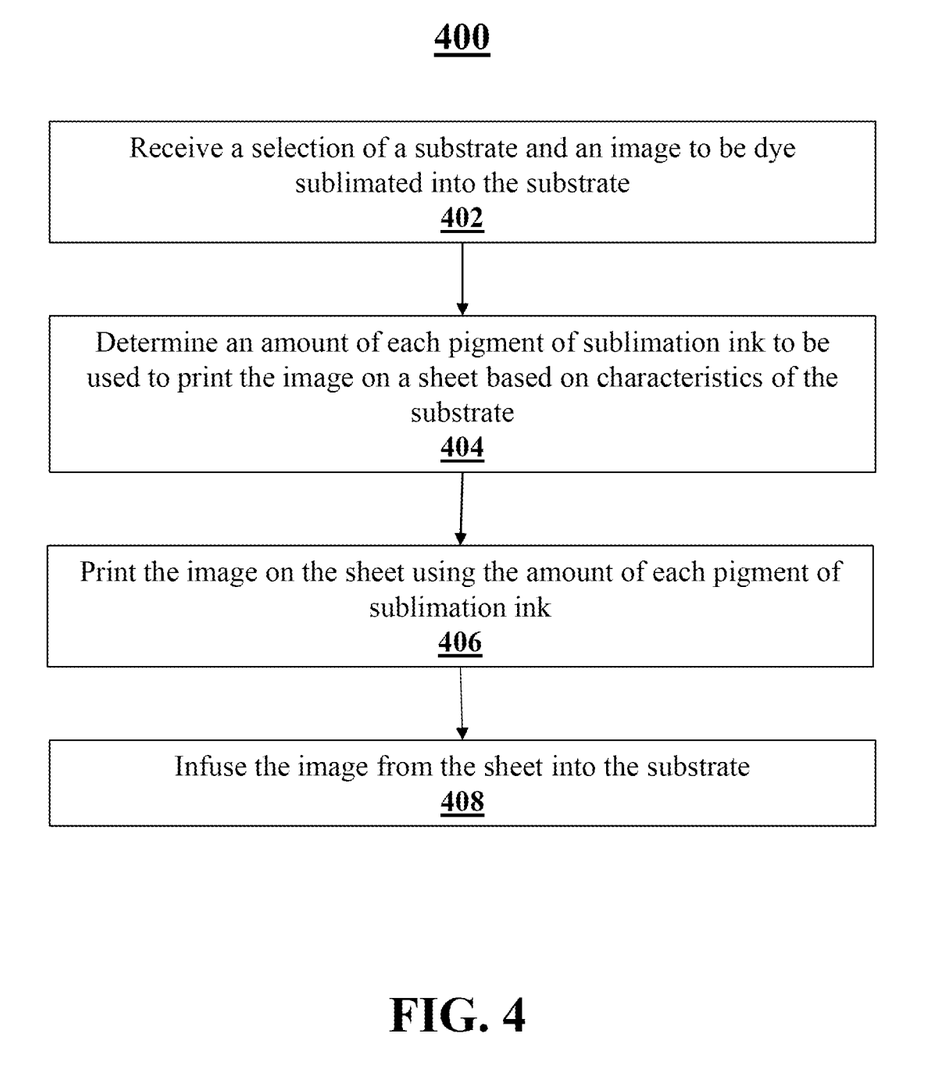
FIG. 4 shows a flow diagram of an illustrative method for dye sublimation, according to an embodiment.

FIG. 4 shows a flow diagram of an illustrative process 400 for dye sublimation, according to an embodiment. It should be understood that the steps shown in FIG. 4 and described herein are merely illustrative and alternative, additional, and fewer number of steps should also be considered within the scope of this disclosure. Although multiple components may perform one or more steps of the process 400, the following describes, for brevity, a single processor executing some or all of the steps of the process 400.

The process 400 may begin at operation 402, where the processor may receive a selection of a substrate and an image to be dye sublimated into a substrate. The image can be an image that was previously dye sublimated onto a different substrate or it can be a new image.

At a next operation 404, the processor may determine an amount of each pigment of sublimation ink to be used to print the image on a sheet based on characteristics of the substrate. During operation 404, the processor may use a machine learning model to accurately predict the amount of each pigment that is required to print the image on the sheet that is later used to infuse the image into the substrate. Alternatively, the user may use the machine learning model to provide amounts of the pigments that are accurate to within a threshold and thereafter make minor adjustments to those amounts to produce the final images. Still as another example, the user may query a database for pigment amounts that were used in previous instances in which the desired color or set of colors were produced in the final images. The database may have been populated by a machine learning model or iteratively input after each time an image was dye sublimated onto the substrate.

At a next operation 406, the dye sublimation apparatus may print the image on a sheet using the amount of each pigment of sublimation ink that was determined in operation 404. The dye sublimation apparatus may include a printer that can print the image onto the sheet. The dye sublimation apparatus may be controlled by the processor.

At a next operation 408, the dye sublimation apparatus may infuse the image from the sheet into the substrate. Accordingly, the final image that is infused into the substrate may be substantially the same as the final image that is infused in other substrates.

The foregoing process descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a process, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for printing an image to be infused into a substrate through dye sublimation, the method comprising:
   receiving, by a processor, a selection of the substrate and the image to be dye sublimated into the substrate;
   determining, by the processor, an amount of each pigment of sublimation ink to be used to print the image on a sheet based on at least one of a characteristic of the substrate and the image, wherein the determination includes:
      providing the at least one characteristic of the substrate and the image to a database; and
      receiving from the database the amount of each pigment of sublimation ink;
   printing, by a dye sublimation apparatus, the image on the sheet using the amount of each pigment of sublimation ink; and
   infusing, by the dye sublimation apparatus, the image from the sheet into the substrate.

2. The method of claim 1, wherein the at least one characteristic of the substrate and the image includes at least one of a color and a material of the substrate.

3. The method of claim 1, further comprising:
   collecting, by the processor, a plurality of images that were infused into a plurality of substrates;
   creating, by the processor, a training set comprising the plurality of images, the amount of each pigment of sublimation ink that was used for the plurality of images, and characteristics of the plurality of substrates that were infused with the plurality of images; and
   training, by the processor, a neural network using the training set,
   wherein determining the amount of each pigment includes inputting, by the processor, the selection of the substrate and the image into the neural network.

4. The method of claim 3, wherein each of the plurality of images includes at least one of a single pixel of an image, a portion of an image, or an entirety of an image.

5. The method of claim 3, further comprising, outputting, by the neural network, the amount of each pigment of sublimation ink within a threshold.

6. The method of claim 3, wherein the neural network is configured to output a predicted amount of each pigment of sublimation ink within a threshold for the substrate.

7. The method of claim 3, further comprising populating a database connected to the processor with the training set and a predicted amount of each pigment of sublimation ink within a threshold for the substrate output by the neural network.

8. The method of claim 1, wherein the database includes a plurality of entries of the amount of each pigment according to the substrates.

9. The method of claim 1, wherein the substrate is a first substrate, the method further comprising:
collecting, by the processor, a plurality of images that were infused into a plurality of substrates, the amount of each pigment of sublimation ink that was used for the plurality of images, and characteristics of the substrates that were used for the plurality of images;
creating, by the processor, a plurality of training sets, wherein each of the plurality of training sets is associated with one of the plurality of substrates; and
training, by the processor, a neural networks for each of the plurality of training sets, wherein the neural networks are configured to output a predicted amount of each pigment of sublimation ink within a threshold for the associated one of the plurality of substrates;
wherein determining the amount of each pigment includes selecting the predicted amount from the neural network associated with the first substrate.

10. A system for printing an image to be infused into a substrate through dye sublimation, comprising:
a processor configured to:
receive the substrate and the image to be dye sublimated into the substrate; and
determine an amount of each pigment of sublimation ink based on the image and the substrate, wherein determine the amount of each pigment of sublimation ink includes:
input at least one characteristic of the substrate and the image into a neural network; and
receive the amount of each pigment of sublimation ink from the neural network;
a printer configured to print the image on a sheet using the amount of each pigment of sublimation ink; and
a dye sublimation apparatus configured to dye sublimate the image into the substrate.

11. The system of claim 10, wherein the at least one characteristic of the substrate includes at least one of a color and material of the substrate.

12. The system of claim 10, wherein the processor is further configured to:
collect a plurality of images that were infused into a plurality of substrates;
create a training set comprising the plurality of images, the amount of each pigment of sublimation ink that was used for the plurality of images, and characteristics of the plurality of substrates that were infused with the plurality of images; and
train the neural network using the training set.

13. The system of claim 12, wherein each of the plurality of images includes at least one of a single pixel of an image, a portion of an image, or an entirety of an image.

14. The system of claim 12, wherein the neural network is configured to output the amount of each sublimation ink within a threshold.

15. The system of claim 10, wherein determine the amount of each pigment of sublimation ink includes:
select, as the neural network, a neural network associated with the substrate from a plurality of neural networks corresponding to a plurality of substrates;
input the image into the selected neural network; and
receive the amount of each pigment of sublimation ink from the selected neural network.

16. A system for printing an image to be infused into a substrate through dye sublimation, comprising;
a processor configured to:
receive the substrate and the image to be dye sublimated into the substrate; and
determine an amount of each pigment of sublimation ink based on the image and the substrate, wherein determine the amount of each pigment of sublimation ink includes:
provide at least one characteristic of the substrate and the image to a database; and
receive from the database the amount of each pigment of sublimation ink;
a printer configured to print the image on a sheet using the amount of each pigment of sublimation ink; and
a dye sublimation apparatus configured to dye sublimate the image into the substrate.

17. The system of claim 16, wherein the database includes a plurality of entries of the amount of each pigment according to the substrate.

18. The system of claim 17, wherein the database is populated with a plurality of entries of the amount of each pigment according to the substrate by a neural network trained using a training set comprising a plurality of images, an amount of each pigment of sublimation ink that was used for the plurality of images, and characteristics of a plurality of substrates that were infused with the plurality of images.

* * * * *